(12) United States Patent
Stafford

(10) Patent No.: US 6,540,205 B1
(45) Date of Patent: Apr. 1, 2003

(54) FINE-ADJUSTMENT FLOW CONTROL VALVE

(76) Inventor: Bryan W Stafford, P.O. Box 6368, Torrance, CA (US) 90504

(*) Notice: Subject to any disclaimer, the term of this patent is extended or adjusted under 35 U.S.C. 154(b) by 0 days.

(21) Appl. No.: 10/234,071

(22) Filed: Sep. 3, 2002

Related U.S. Application Data

(62) Division of application No. 09/875,552, filed on Jun. 7, 2001, now abandoned.

(51) Int. Cl.[7] ............................................. F16K 31/44
(52) U.S. Cl. ...................... 251/215; 251/205; 251/208; 251/264
(58) Field of Search ............................... 251/205, 208, 251/215, 218, 264, 265, 274, 229

(56) References Cited

U.S. PATENT DOCUMENTS

| | | | | |
|---|---|---|---|---|
| 1,736,253 A | * | 11/1929 | Collar | 251/215 |
| 2,275,397 A | * | 3/1942 | Davies | 251/9 |
| 2,764,995 A | * | 10/1956 | Krupp et al. | 137/241 |
| 3,010,695 A | * | 11/1961 | Banks | 251/205 |
| 4,185,807 A | * | 1/1980 | Milliren | 251/218 |
| 4,488,704 A | * | 12/1984 | Wicker | 251/265 |
| 4,928,920 A | * | 5/1990 | Feild | 251/118 |
| 5,083,749 A | * | 1/1992 | Linderman et al. | 251/214 |
| 5,393,035 A | * | 2/1995 | Steele | 137/556.6 |
| 5,419,530 A | * | 5/1995 | Kumar | 251/95 |
| 5,694,971 A | * | 12/1997 | Wilcock | 137/318 |
| 6,102,367 A | * | 8/2000 | Schmitz et al. | 251/265 |
| 6,196,523 B1 | * | 3/2001 | Miyata et al. | 251/276 |

* cited by examiner

Primary Examiner—David A. Scherbel
Assistant Examiner—F. Nicolas
(74) Attorney, Agent, or Firm—Monty Koslover

(57) ABSTRACT

An addition of a fine adjustment flow-control mechanism that produces changes in fluid flow in increments of 0.1% or less, to any configuration high pressure fluid flow control valve that employs an axial valve stem and a rotatable rough control knob that moves the stem axially in increments of 1.0% or more, opening the valve flow chamber to fluid flow. The valve stem is designed and driven so that it does not rotate or twist, and provision is made to minimize control drive tolerance build-up. These aspects produce a high degree of adjustment accuracy during operation of the flow control valve.

3 Claims, 3 Drawing Sheets

FINE-ADJUSTMENT FLOW CONTROL VALVE

This application is a divisional of Ser. No. 09/875,552 filed on Jun. 7, 2001 which is now abandoned.

BACKGROUND OF THE INVENTION

1. Field of the Invention

This invention relates to fluid flow control valves and more particularly to those valves for use in industrial systems requiring control of high pressure chemical and other fluids.

2. Background

There has long been a continuing use in the chemical industry and others for fluid control valves which are adapted for high pressure fluids, and that can be adjusted to accurately set flow to any percent of maximum flow rate at a fixed inlet pressure. Such fluid control valves are characterized as employing an axial plunger or stem and a manually rotatable knob to adjust the position of the plunger in the valve body. Setting the flow rate is effected by rotating the cap or knob to a marked position that corresponds to a given percentage of the maximum rated flow.

Several available fluid control valves have the capability of setting and roughly adjusting a flow rate to within a few percent, which has satisfied the process needs of many users in the past. However, a substantial number of present day users now require a finer flow control, allowing valve flow rate to be set at levels including a fraction of 1 percent. For example, at one part of a given mixing process, the required flow rate could be 15.7% with an accuracy of better than +/−0.5% of max flow. This is difficult to obtain accurately with presently available rough flow control valves, although some valves have marked adjustments corresponding to 0.5% or less of flow rate. In industry practice, any valve having flow adjustment capability of 1.0% steps would be calibrated and flow rate set at the desired level prior to installing the valve in the system, to achieve the required process flow rate. This practice precludes any possibility of adjusting the flow rate after a valve is installed. There is therefore a need for a flow control valve that includes provision for micro or fine adjustment of fluid flow in steps of less than 1.0% after the valve has been installed, in addition to the currently available rough control steps.

SUMMARY OF THE INVENTION

A principal object of this invention is to provide a micro or fine adjustment means for controlling fluid flow, that comprises a combination of mechanical components which interact with the structure of a high pressure flow control valve to produce changes in the valve stem position and thereby in valve fluid flow, in steps of 0.1% of maximum valve flow rate. A secondary object is to increase the present accuracy of valve flow control settings. Further objects and advantages of the invention will be apparent from studying the following portion of the specification, the claims and the attached drawings.

DESCRIPTION OF THE PREFERRED EMBODIMENT

The invention is the addition of a fine adjustment flow-control mechanism that produces changes in fluid flow in increments of 0.1% or less, to any configuration high pressure fluid flow control valve that employs an axial valve stem and a rotatable rough control knob that moves the stem axially in increments of 1.0% or more, opening the valve flow chamber to fluid flow from inlet port to outlet port. The fine adjustment flow-control mechanism described herein includes an axial valve stem and a portion of the rough control knob, both of which are required to be particularly adapted in order to properly interact with the controlling parts of the mechanism.

Figure 1:
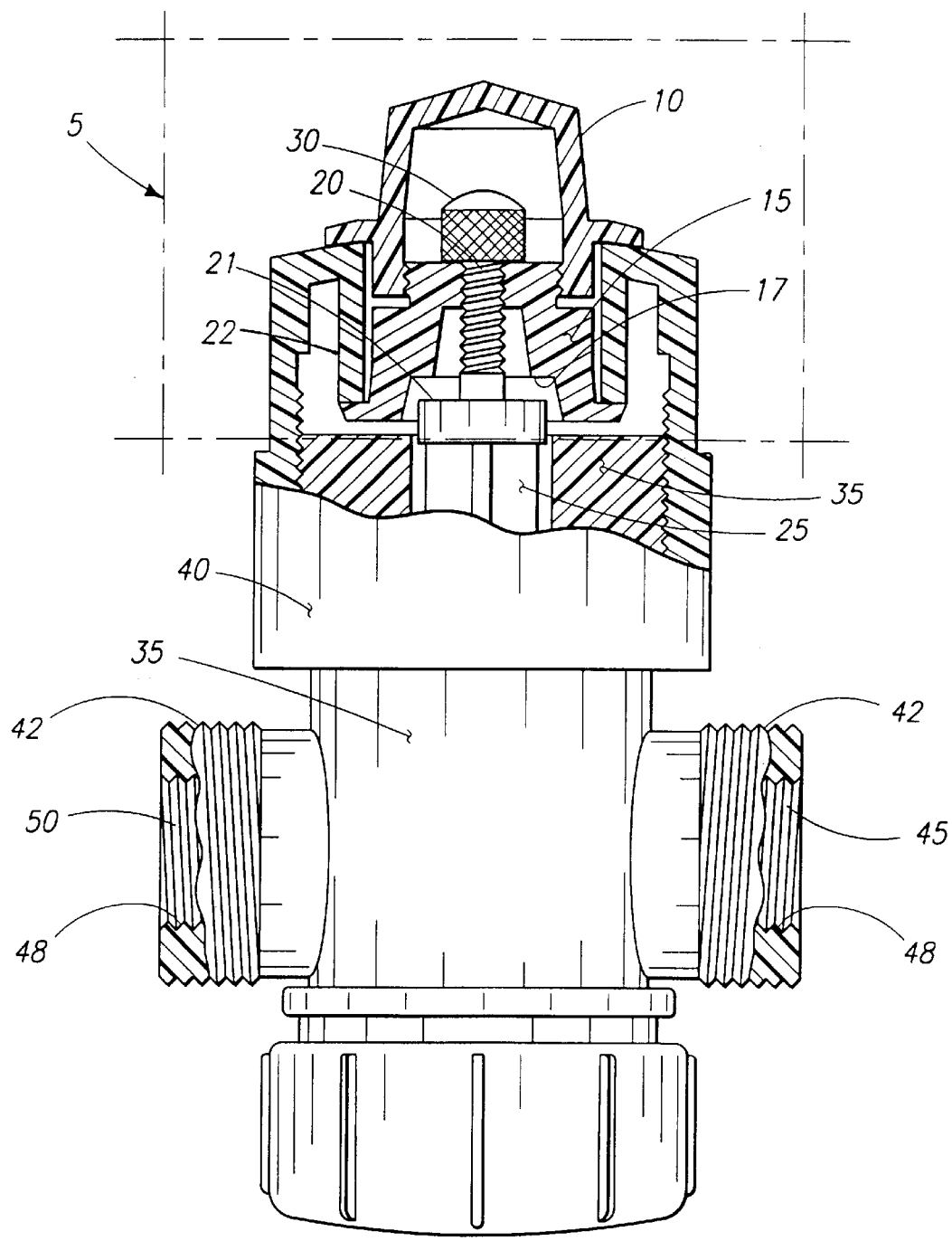
FIG. 1 is a partially cut-away elevation view of a fluid flow control valve, particularly showing in axial cross-section, a preferred embodiment of the fine adjustment flow-control mechanism according to the present invention.

Referring particularly to the drawings, there is shown in FIG. 1 a sectional view 5 of the preferred fine adjustment flow-control mechanism including the top of an adapted valve stem 25 as integrated in a typical configuration high pressure fluid flow control valve.

The elements comprising the fine adjustment flow-control mechanism are: a fine control assembly which consists of a fine control knob 10 and a collar member 15; a valve stem 25 which has a threaded screw member 20 projecting up axially from its top surface 21; and a stop nut 30 that is fastened to the top of the stem screw member 20 to prevent the collar member 15 from winding off the end of the member's thread.

The top central portion of the rough control knob 40 has attached, a substantially annular, cylindrical section 22 that projects downwards, and is adapted to fit loosely around and support a hub formed by peripheral lips extending from the fine control knob 10 and its' attached collar member 15.

During any rough control flow rate adjustment, rotation of the rough control knob 40 will not cause either the fine control assembly or the valve stem 25 to rotate in the valve body 35. Instead, the valve stem 25 will move up or down without forced rotation. This innovation results in improved accuracy in setting the valve flow rate, for the following reasons:

In the well known, available, high pressure fluid control valves, there exists a compounded vertical position error due to unavoidable clearances between the driving edges of the rough control knob and the driven edge or surface of the valve stem. When a valve stem is made to rotate by a rough control knob, the applied torque often causes the tight body-fitting valve stem to twist somewhat and not fully rotate, resulting in the stem taking up part or all of the vertical clearances. The valve stem position will be therefore off by the amount of the vertical clearances.

For a valve which incorporates the invention fine adjustment flow control mechanism described above, there is no valve stem twisting induced by applied torque, and consequently there is an increased accuracy in setting a flow rate. This improvement is particularly important for small size valves where the vertical drive clearances form a greater portion of the valve chamber height than is the case for large valves.

The fine control knob 10 and its attached collar member 15, are fixed in vertical position with respect to the rough control knob 40 by means of peripheral projecting lips which form a hub-like shape that engages a section 22 of the rough control knob. As a result, rotating the fine control knob 10 and thereby, the collar member 15 around the threaded top 20 of the valve stem 25, produces a jack-screw motion, with the valve stem 25 moving straight up or down with respect to the rough control knob 40. The amount of stem displacement is directly related to the size of the threads on the valve stem top projection 20 and the number of threads turned by the fine control knob 10.

The number and size of the threads on the stem top member 20 projection can be selected so that a full turn of one thread produces a 0.1% change in the valve chamber opening. Thus, ten rotations of the fine control knob 10 will produce a 1.0% change. This is the typical range of the fine adjustment control. However, the fine adjustment range may be extended to be 0 to 2.0% or 5.0% as needed.

In the view shown in FIG. 1, the fine adjustment control is at one end of its travel range, in this case, being the zero or closed position. A wide space is shown between the top surface 21 of the stem 25 and the central inset surface 17 of the collar member 15 which is above it. This would be the stem normal position when the valve flow chamber is fully closed to flow by application of the rough control knob 40.

Figure 2:
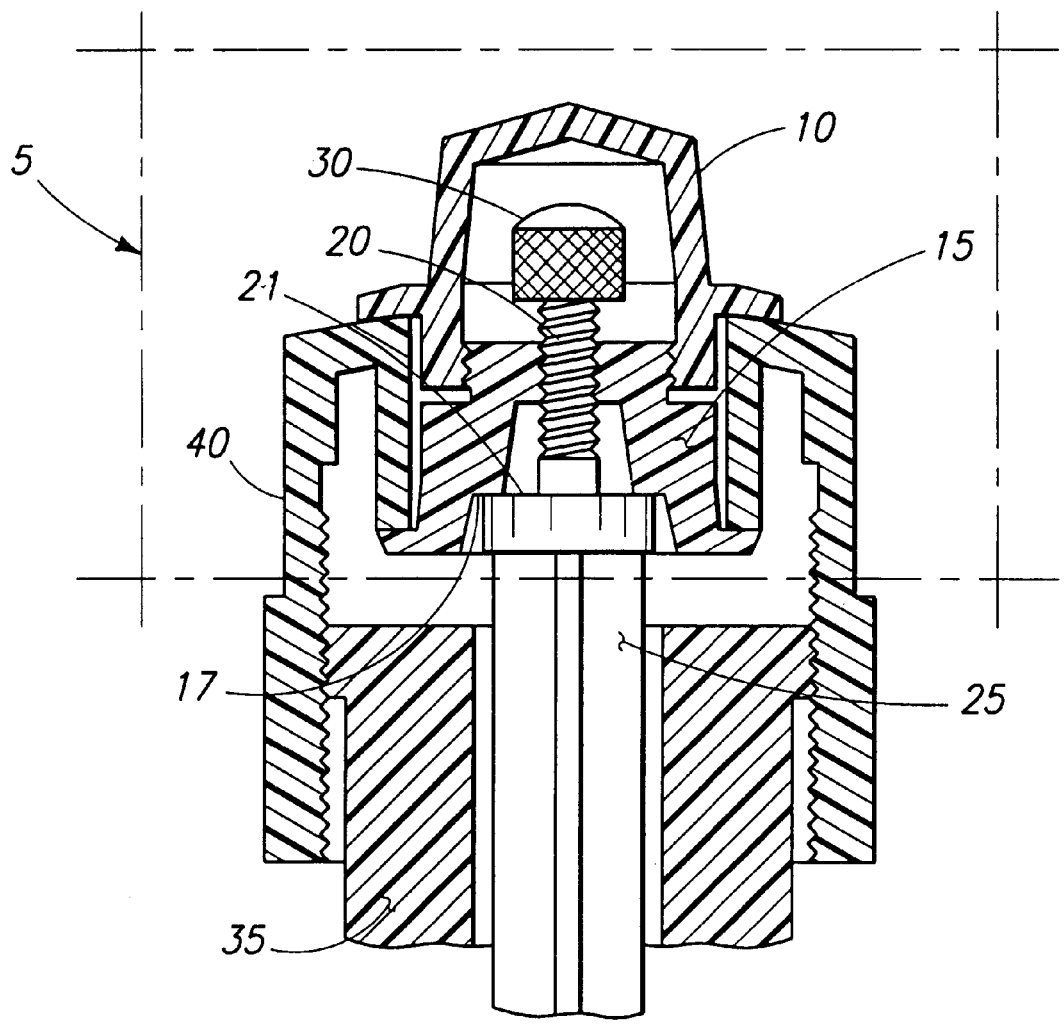
FIG. 2 is another axial cross-section view of the fine adjustment flow control mechanism incorporated into a control valve according to the present invention, particularly showing a modified valve stem at a position corresponding to the maximum travel of the fine adjustment control means.

FIG. 2 shows the fine adjustment control at the other end of its travel range or opening. This range may be previously fixed at either 1.0% or 5.0% open, depending on the user's needs. It should be noted that the top circular surface 21 of the valve stem 25 butts up against the collar member inset surface 17 when the fine flow-control is at its adjusting limit, preventing the stem top projection 20 from further unthreading. The valve chamber opening may be set by use of the rough control knob 40 to be fully or partially opened at any time. This is left to the operator's decision, so that the fine control adjustment may be used at any degree of valve chamber opening as is needed.

It is also apparent, therefore that the fine flow-control may be used alone without the rough control, to produce an accurate, small flow rate setting in the range of 0.0% to 5.0% in steps of 0.1%. This capability would be extremely difficult to achieve with currently available flow control valves that do not include fine control means.

Referring back to FIG. 1, another innovation is shown that is not related to the present fine control invention. This is the use of an outer set of screw threads 42 and an inner set of screw threads 48 to the valve inlet connector 45 and outlet connector 50. By these connections, two different sizes and diameter flow pipe connections can be accommodated by one flow control valve, and the number of different size valves required to be stocked can be reduced.

Referring now to FIGS. 3, 4A, 4B, 5A and 5B, there is shown detail of the components comprising the fine control assembly and the valve stem 25.

The fine control knob 10 has a generally cylindrical shape, closed at its top and sized to be grasped by the hand and rotated. It includes a circumferential lip 11 that is sized to fit over and rest on the top surface of a valve rough control knob 40 when the fine control knob is installed. A threaded portion 12 of the knob 10 inside surface adjacent to its lower open end, is provided as a means for fastening to a top stepped portion of the collar member 15.

Figure 3:
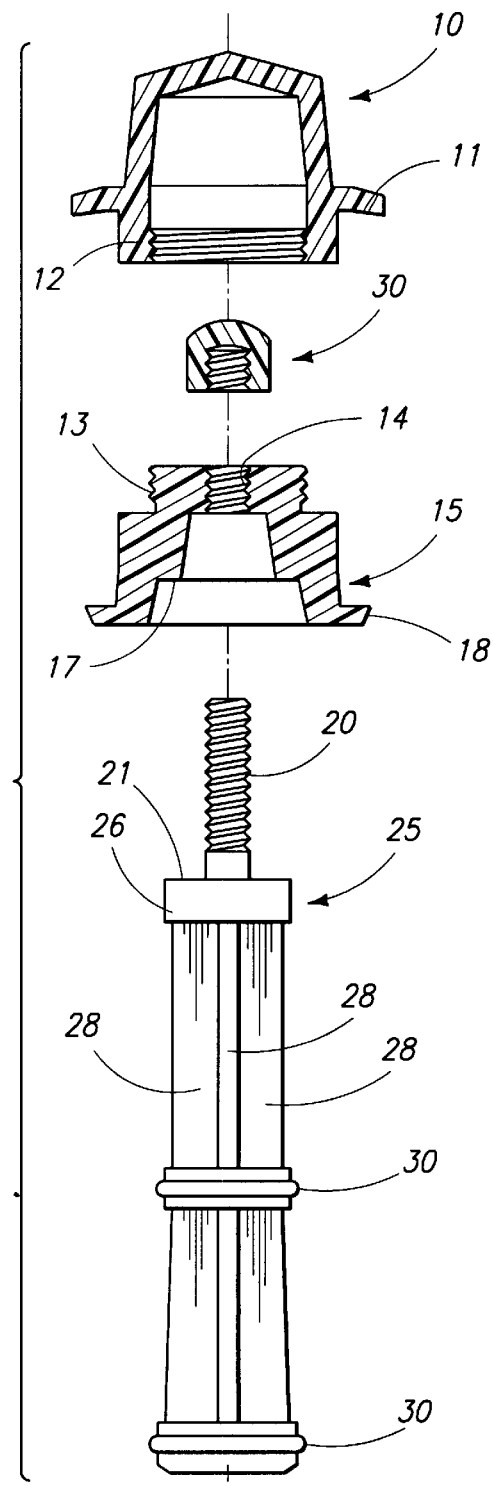
FIG. 3 is an exploded view of the components of the fine control assembly, according to the present invention.
Figure 4A:
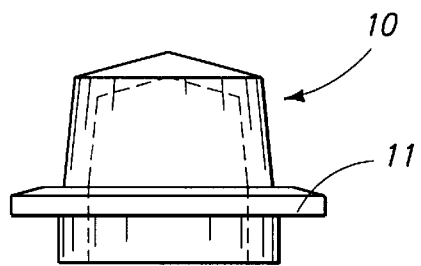
FIGS. 4A and 4B are respectively, a side elevation view and bottom view of the fine control knob component; and, FIGS. 5A and 5B are respectively, a side elevation view and a bottom view of the collar member component.
Figure 4B:
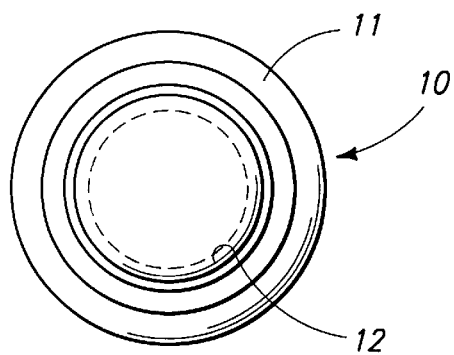
Figure 5A:
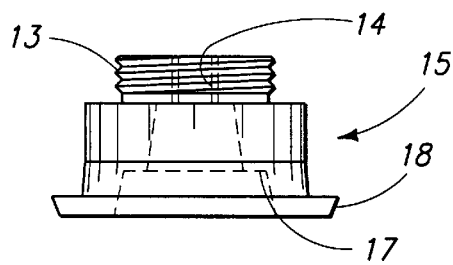
Figure 5B:
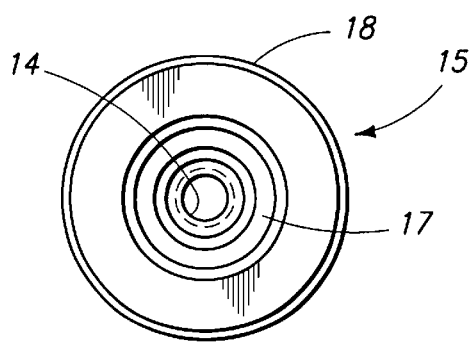

The collar member 15, which is shown in FIGS. 3, 5A and 5B, includes a stepped, threaded portion 13 that mates with the control knob 10 fastening means described above, and a top axial threaded through hole 14 which has an internal thread peak-to-peak dimension equivalent to 0.1% of the height of the valve flow chamber. The top screw member 20 of the valve stem 25 thus fits into the threaded hole 14 and holds the valve stem 25 to the collar member 15.

As shown in FIG. 3 and the bottom plan view of FIG. 5B, the collar member has an internal cavity which is concentric and communicates with the top threaded hole 14. The cavity also has a recessed, stepped opening 17 at its bottom end. This recessed stepped opening 17 is sized in diameter to receive and seat the top shoulder surface 21 of the valve stem 25, stopping further upward movement of the thread screw-engaged valve stem as required. Finally, a lip 18 that extends around the periphery of the bottom edge of the collar member and the lip 11 extending around the fine control knob 10 create a hub that serves as a means to fit with a downward projecting, annular section 22 which is attached to the top circular opening in the cover of the rough control knob 40.

The valve stem 25 which has a body shape typical of those required for high pressure flow control valves, is adapted to fit the fine adjustment mechanism by the addition of an axial threaded screw member 20 projecting upwards from its top portion 26. The screw member 20 has a screw thread peak-to-peak dimension equivalent to 0.1% of the height of the valve flow chamber, and a threaded length greater than 5% of the height of said valve flow chamber, providing for the full range of flow adjustment.

A further modification is the use of at least four longitudinal, radially projecting ribs 28 equally spaced apart and running the length of the stem body. These ribs are incorporated to provide stiffening, opposing any applied torque that could twist the valve stem body and introduce inaccuracy in the valve opening adjustment. Standard "O" rings 30 are included for sealing and holding the stem 25 body in the valve body 35.

All the component parts of the preferred embodiment fine flow-control assembly are made from hard, rigid plastic, using the same materials as used for present industrial high pressure flow control valves. This aspect makes it easy to adapt any of the present high pressure control valve configurations to incorporate the invention fine control mechanism.

The invention fine flow-control mechanism described above may be used in all sizes of flow control valves which are used in industrial laboratories and production facilities requiring accurate flow control.

From the above description, it is clear that the preferred embodiment achieves the objects of the present invention.

Alternative fine flow-control mechanisms and various modifications may be apparent to those skilled in the art. These alternatives and modifications are considered to be within the spirit and scope of the present invention.

Having described the invention, what is claimed is:

1. In a high pressure fluid flow control device that is used for making varying adjustments to a supply flow rate, said device including a valve body; a valve flow chamber inside said valve body; an inlet port and flow channel that extends through said valve body and said valve flow chamber to an outlet port, said valve flow chamber having a height Rand vertical cross-section area commensurate with a predetermined maximum fluid flow rate through said valve body; an axial bore for a valve stem through said valve body and extending to intersect said valve flow chamber; and a rough control knob comprising a substantially annular cylindrical shell containing a cylindrical internal cavity extending along a longitudinal axis, and an outwardly convex portion at one end forming a top cover, said top cover including a top circular opening to said cavity that is centered on said longitudinal axis of said shell, said rough control knob being rotatably attached to said valve body;

a fine adjustment flow control mechanism comprising:
(a) a fine control assembly comprising a generally cylindrical fine control knob and an attached collar member; said fine control knob having a body composed of an inwardly tapering upper portion and a cylindrical lower portion; said body containing an internal cavity which extends along a longitudinal axis, said cavity having a circular first opening at a lower end of said lower portion; said lower portion having an outer diameter which is sized to fit with clearance inside said top circular opening in said rough control knob; said upper portion of said fine control knob being sized for manual gripping during flow adjustment;

said collar member having a generally cylindrical shape matching the outer diameter of said lower portion of said fine control knob and having a stepped upper portion; said stepped upper portion including an axially centered first threaded through hole; said collar member including a recessed stepped opening in a bottom surface which provides a radially inset shoulder to act as a stop to upper movement of a valve stem, said stepped opening communicating with said first threaded through hole; said first threaded through hole having a screw thread peak-to-peak dimension equivalent to 0.1% of the height of said valve flow chamber;

said stepped upper portion of said collar member being mated with said circular first opening in said lower portion of said fine control knob for fastening coaxially, and forming said fine control assembly;

(b) means for fastening said collar member coaxially to said fine control knob;

(c) means for rotatably mounting said fine control assembly to said rough control knob;

(d) a valve stem, comprising a tapered rod body and two "O" rings; said rod body including a multiplicity of longitudinal, radially projecting ribs for stiffening said rod, a cylindrical top portion, a cylindrical center portion, a cylindrical bottom portion, and a threaded screw member that projects axially from a top surface of said top portion; said center portion and said bottom portion both having a deep peripheral groove to seat an "O" ring, said screw member having a screw thread peak-to-peak dimension equivalent to 0.1% of the height of said valve flow-chamber, and a threaded length greater than 5% of the height of said valve flow chamber;

said screw member connecting said rod body to said collar member through said first threaded through hole; and, (e) a stop nut, said stop nut being fastened to a top end of said screw member after said screw member is attached to said collar member; said stop nut when fastened, marking one end of the valve stem fine adjustment range and providing a stop to further lowering movement of said valve stem when said valve stem is lowered causing said stop nut to abut said collar member;

said fine control knob, when manually rotated, causing said collar member to rotate around said screw member which is attached to said valve stem, forcing said valve stem to move directly upwards or downwards in the valve bore in increments of 0.1% or less of maximum valve flow, in relation to a prior valve stem opening position established by use of said rough control knob.

2. The fine adjustment flow control mechanism according to claim 1, wherein said means for rotatably mounting said fine control assembly includes:

a peripheral, outward extending lip around said fine control knob and a peripheral, outward extending lip around a bottom edge of said collar member; said collar member and said fine control knob, when axially fastened together, forming a hub with the lip of said collar member and said fine control knob acting as the hub rims; and an annular section that is attached to said top cover of said rough control knob, concentric with said top circular opening and projecting downwards, said annular section having a length and a diameter which is adapted to fit closely around said hub between said hub rims; said hub providing a mounting for said fine control assembly to said rough control knob while permitting independent rotation of said fine control assembly.

3. The high pressure fluid flow control device of claim 1 wherein said inlet port and said outlet port, each have an outer, peripheral threaded fastening portion and an internal diameter threaded fastening portion that are located at a projecting end of each port, providing for fastening of either one of two different diameter flow pipe connections.

* * * * *